March 17, 1953 F. H. HANLEY 2,632,054
HUB TELEGRAPH REPEATER
Filed July 30, 1951
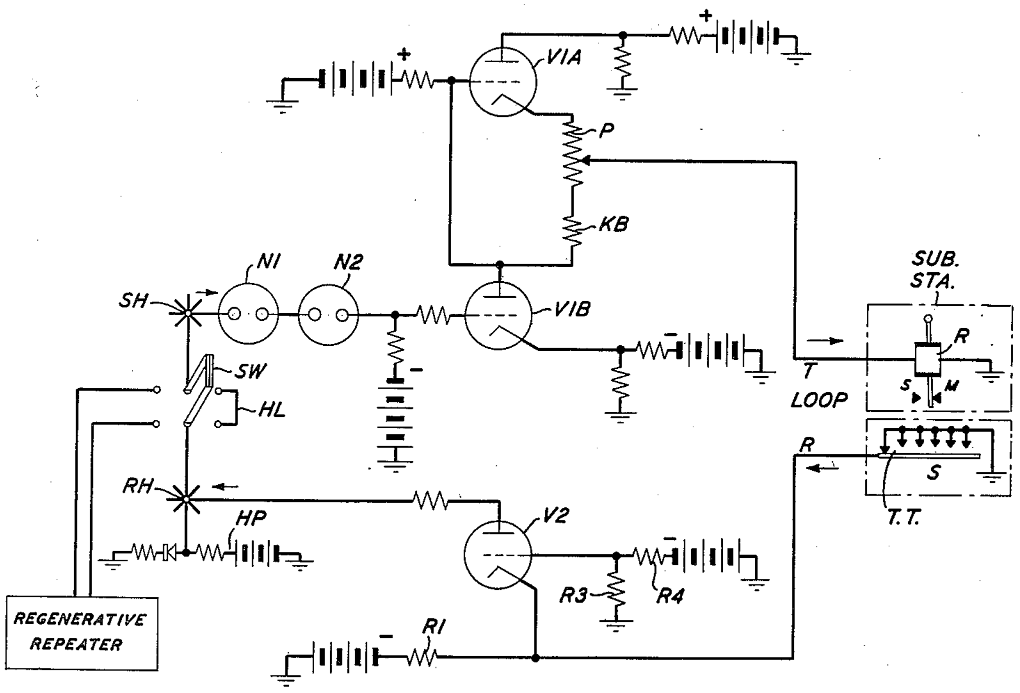
INVENTOR
F. H. HANLEY
BY
John E. Cassidy
ATTORNEY Patented Mar. 17, 1953 2,632,054

UNITED STATES PATENT OFFICE 2,632,054

HUB TELEGRAPH REPEATER

Frank Harold Hanley, Butler, N. J., assignor to American Telephone and Telegraph Company, a corporation of New York Application July 30, 1951, Serial No. 239,339

5 Claims. (Cl. 178—73)

This invention is an improved hub type telegraph repeater and more particularly an improved hub type electronic subscriber loop telegraph repeater circuit. Hub type electronic subscriber loop repeaters are disclosed for instance in patent application of W. T. Rea, Serial No. 123,366, filed October 25, 1949, now Patent No. 2,594,993, of which the present arrangement represents an improvement.

In hub type telegraph repeater operation, as presently practiced, a number of telegraph lines and loops such as three to ten or more, for instance, may be interconnected through a central point or hub of the concentration. Any one of the circuits connected through a hub may transmit to all of the others simultaneously. Each one of the lines and loops is equipped with an individual coupling unit circuit, or hub repeater control circuit as it is known in the art. It is the function of the coupling unit circuit to control transmission so that ordinary communication signals which are being transmitted toward the hub from one repeater cannot be transmitted back through the same repeater to their source which would mutilate the signals being transmitted. The coupling unit also is now arranged so that if more than one repeater circuit connected to a hub concentration attempt to transmit simultaneously the condition is recognized and garbled communication signals produced. As a result the plural signals on the hub are transmitted to all stations including the simultaneously transmitting stations as an indication of the abnormal condition.

Coupling units or controls circuits in hub repeater circuits have taken a number of forms. Originally they comprised magnetic relays. More recently they are electronic circuits comprising numbers of space discharge devices, metallic oxide rectifiers, and potentiometers. At present the approved means of interconnecting a subscriber telegraph loop repeater to a hub is through a two-conductor circuit in which the two conductors are joined at the subscriber station to form a loop and which is equipped at the central telegraph station with an electronic repeater and an electronic coupling unit which interconnect the two conductors and perform the control functions described generally in the foregoing. This circuit is quite expensive, however. The present invention is a less expensive manner of interconnecting a subscriber telegraph station to a hub. It comprises an electronic repeater circuit but eliminates the coupling unit or control circuit. This is effected by completely separating the transmitting and receiving paths from the subscriber station to the hub. One of the two conductors is used for transmitting and the other for receiving. Since the two paths are independent no coupling unit or control circuit is necessary and none is employed.

As a result of eliminating the coupling unit, the initial cost of the circuit is less and there are fewer elements to give trouble resulting in less maintenance expense.

The invention may be understood from the following description when read with reference to the associated drawing which taken together disclose a preferred embodiment in which the invention is presently incorporated. It is to be understood, however, that the invention may be incorporated in other embodiments which will be suggested to those skilled in the art from a consideration of the following.

In the drawing a subscriber station SUB STA is shown at the right. It is connected by means of two conductors T and R to an electronic repeater and then to a hub. The upper portion of the circuit is used in transmitting from the sending hub SH toward the subscriber station SUB STA. The lower portion of the circuit is used in transmitting from the subscriber station SUB STA to the receiving hub RH. The two conductors T and R interconnecting the subscriber station to the electronic telegraph repeater are not connected at the subscriber station to form a loop as has been the invariable practice heretofore when subscriber stations have been connected to a hub concentration. In the present case each of conductors T and R is connected to ground at the subscriber station. After passing through the electronic repeater equipment at the telegraph repeater station the two paths are joined at the left side of the drawing through the hub. The sending hub SH is shown, with spurs or straps radiating therefrom to indicate the sending legs of other subscribers' telegraph loops and other telegraph lines which are interconnected to the same sending hub. Similarly, the receiving hub RH is shown with spurs or straps radiating therefrom to indicate the receiving legs of other subscriber loops or telegraph lines. The sending hub SH and the receiving hub RH are connected respectively individually to the blades of a double-pole double-throw switch which may be operated to its right-hand position to interconnect the sending hub SH and the receiving hub RH through the hub link conductor HL in which case both hubs electrically constitute a single point, or, if regeneration is required, the switch SW may be operated to its left-hand position to interconnect the regenerative repeater between the two hubs. This introduces a delay equal approximately to the duration of about one-half a signal element between the reception of a signal on the receiving hub RH and its transmission on the sending hub SH.

In the following description where the values of constants are given, it is to be understood that they are by way of example, as an aid in understanding the invention. But the invention is not limited to the cited values.

The upper portion of the circuit may be considered to be a one-way electronic repeater for sending from the sending hub SH to the subscriber station SUB STA. It will be assumed that positive 40 volts and negative 40 volts are produced on the sending hub for marking and spacing signals, respectively. The positive and negative batteries indicated on the drawing are assumed to be of 130 volts each.

When a marking signal of positive 40 volts appears on the sending hub, in a manner to be described, approximately 170 volts is applied across neon tubes N1 and N2 in series, causing them to conduct. This causes the grid of triode V1B to become less negative than its cathode allowing the tube to conduct and to produce a current which flows through the tube, resistance KB, lower portion and sliding arm of potentiometer P, conductor T and the winding of polar receiving relay R, at the subscriber station, to ground which actuates the armature of relay R to engage its marking contact. Triode V1A is maintained non-conducting for this condition by the flow of current from tube V1B through resistor KB, which makes the grid of tube V1A approximately 15 volts more negative than its cathode.

When a spacing signal appears on the sending hub SH, negative 40 volts is applied to the left-hand terminal of neon tube N1 and negative 90 volts is applied across the two neon tubes N1 and N2 in series. This causes tubes N1 and N2 to deionize. As a result of this negative 130-volt potential is applied to the grid of triodes V1B which, therefore, becomes non-conducting. This in turn changes the bias on triode V1A from negative to positive and allows tube V1A to conduct and produces a spacing current which flows through the tube, the top portion of potentiometer P, its sliding arm, conductor T and the winding of relay R at the station which current is equal to and of opposite polarity from that previously produced by tube V1B. On the reappearance of the positive 40-volt marking potential on the sending hub the original conditions are restored.

The lower portion of the drawing may be considered a one-way electronic repeater for receiving from the subscriber station SUB STA and impressing the signals on the receiving hub RH. Connected to the receiving hub RH is the hub potentiometer HP which is employed as an aid in obtaining desirable potential swings for the various signal conditions. It will be assumed that for the marking condition a potential of 40 volts positive is produced on the receiving hub RH.

When the subscriber station SUB STA is sending a marking signal the cathode of triode V2 is maintained at negative 70 volts by the potentiometer arrangement formed by the grounded negative battery, resistance R1 and the resistance of the R conductor which is grounded at the subscriber's station SUB STA. The potentiometer formed by resistors R3 and R4, connected between battery and ground, produces a potential of negative 80 volts on the grid of tube V2, which is connected to the junction of resistors R3 and R4. As a result of this tube V2 does not conduct for marking. When the teletypewriter transmitting contacts are opened at the subscriber station SUB STA for the transmission of spacing signal, negative 130 volts is connected through resistor R1 to the cathode of tube V2. Since the grid of tube V2 is now less negative than its cathode tube V2 conducts. As a result of this the potential of the receiving hub RH is changed to negative 40 volts. As a result of this a spacing signal will be transmitted to the sending leg of each circuit connected to the sending hub SH, including the sending leg of the present repeater. The receiving relay R will respond to this to provide a home copy of the transmitted message.

It is emphasized that no coupling unit or control circuit is required between the sending and receiving legs for since the transmitting and receiving legs are separate and independent, the retransmission of an incoming signal back to the station where it originated cannot mutilate the signal and with the present arrangement this is done to provide a home copy.

The operation of the circuit has been described on the basis of one-way operation in each direction to and from a station. In the case of two-way half-duplex operation the two legs of the circuit would both be connected to the hubs as shown and the operation in each direction is identical to that described. For half-duplex operation the subscriber's station receives home copy by way of the central office as described.

Attention is particularly called to the fact that in the present arrangement the invention is described for use with a telegraph repeater of the electronic type. It may also be employed with a magnetic relay type repeater and no coupling unit will be required.

What is claimed is:

1. In a hub telegraph repeater system, a subscriber hub telegraph repeater circuit, said circuit having a receiving repeater and a sending repeater, said receiving repeater completely separated from said sending repeater, a subscriber telegraph station, a subscriber telegraph transmitter and a subscriber telegraph receiver at said station, a telegraph hub, a first telegraph channel extending from ground at said station through said telegraph transmitter and said receiving repeater to said hub, a second telegraph channel extending from said hub through said sending repeater, and said telegraph receiver to ground at said station.

2. A system in accordance with claim 1 including a space discharge device in said receiving repeater and another space discharge device in said sending repeater, to repeat telegraph signals in each direction between said subscriber station and said hub.

3. In a hub repeater telegraph system, a telegraph hub, a subscriber hub electronic telegraph repeater, a subscriber telegraph station, a subscriber telegraph transmitter and a subscriber telegraph receiver at said station, a telegraph transmitting conductor grounded at said station connected through said telegraph transmitter and said hub telegraph repeater to said hub, a telegraph receiving conductor grounded at said station connected through said telegraph receiver and said hub telegraph repeater to said hub, said electronic telegraph repeater comprising individual transmitting and receiving branches each completely separate from the other, each of said branches having a space discharge device, individual to each of said conductors, connected to each of said conductors.

4. In a hub telegraph repeater system, a subscriber telegraph station, a telegraph hub, a subscriber hub telegraph repeater having separate independent transmitting and receiving branches, a transmitting telegraph channel and a receiving telegraph channel, separate from said transmitting channel, interconnecting said subscriber station through said transmitting and receiving branches respectively to said hub and an individual space discharge tube in each of said channels for repeating telegraph signals in opposite directions between said station and said hub.

5. In a hub telegraph system, a subscriber telegraph station having a subscriber telegraph transmitter and a subscriber telegraph receiver, a telegraph hub, a subscriber hub telegraph repeater having a telegraph transmitting branch and a telegraph receiving branch completely separate from and independent of said transmitting branch, a telegraph transmitting channel extending from ground at said station through said transmitter and said transmitting branch to said hub, a telegraph receiving channel, separate from said transmitting channel, extending from ground at said station through said receiver and said receiving branch to said hub, said separate and independent branches to prevent blocking, for producing a home copy of a message transmitted from said station, over said transmitting station through said hub and through said receiving channel.

FRANK HAROLD HANLEY.

REFERENCES CITED

The following references are of record in the file of this patent:

UNITED STATES PATENTS

| Number | Name | Date |
|---|---|---|
| 2,528,120 | Davey | Oct. 3, 1950 |